Oct. 17, 1933.  H. G. MacCHESNEY  1,930,686
EMULSIFYING APPARATUS
Filed March 17, 1933   3 Sheets-Sheet 1
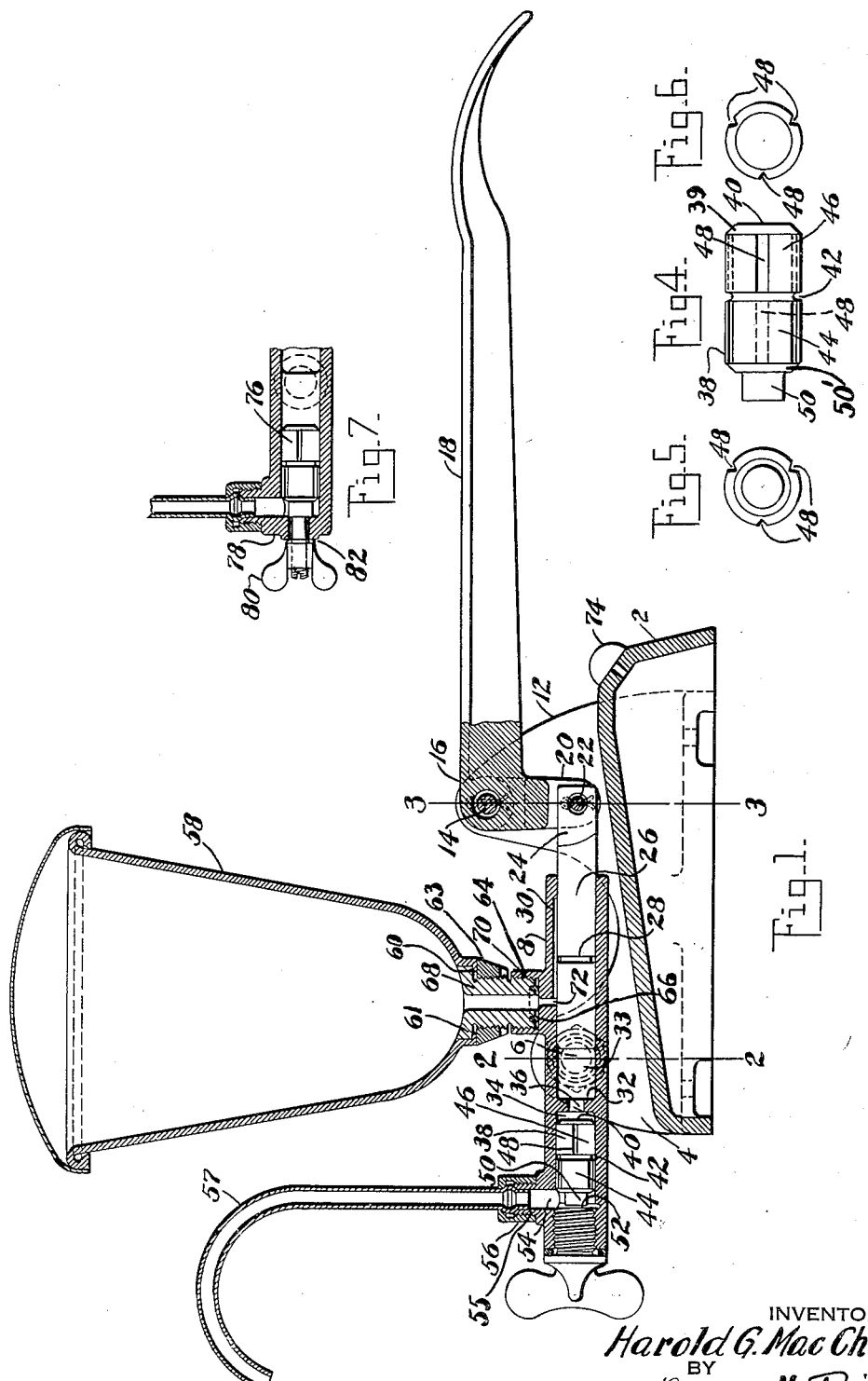
INVENTOR
Harold G. MacChesney
BY
Donald U. Rich
ATTORNEY Oct. 17, 1933.   H. G. MacCHESNEY   1,930,686
EMULSIFYING APPARATUS
Filed March 17, 1933   3 Sheets-Sheet 2

INVENTOR
*Harold G. Mac Chesney*
BY
*Donald U. Rich*
ATTORNEY

Oct. 17, 1933.                H. G. MacCHESNEY                1,930,686
                              EMULSIFYING APPARATUS
                           Filed March 17, 1933            3 Sheets-Sheet 3
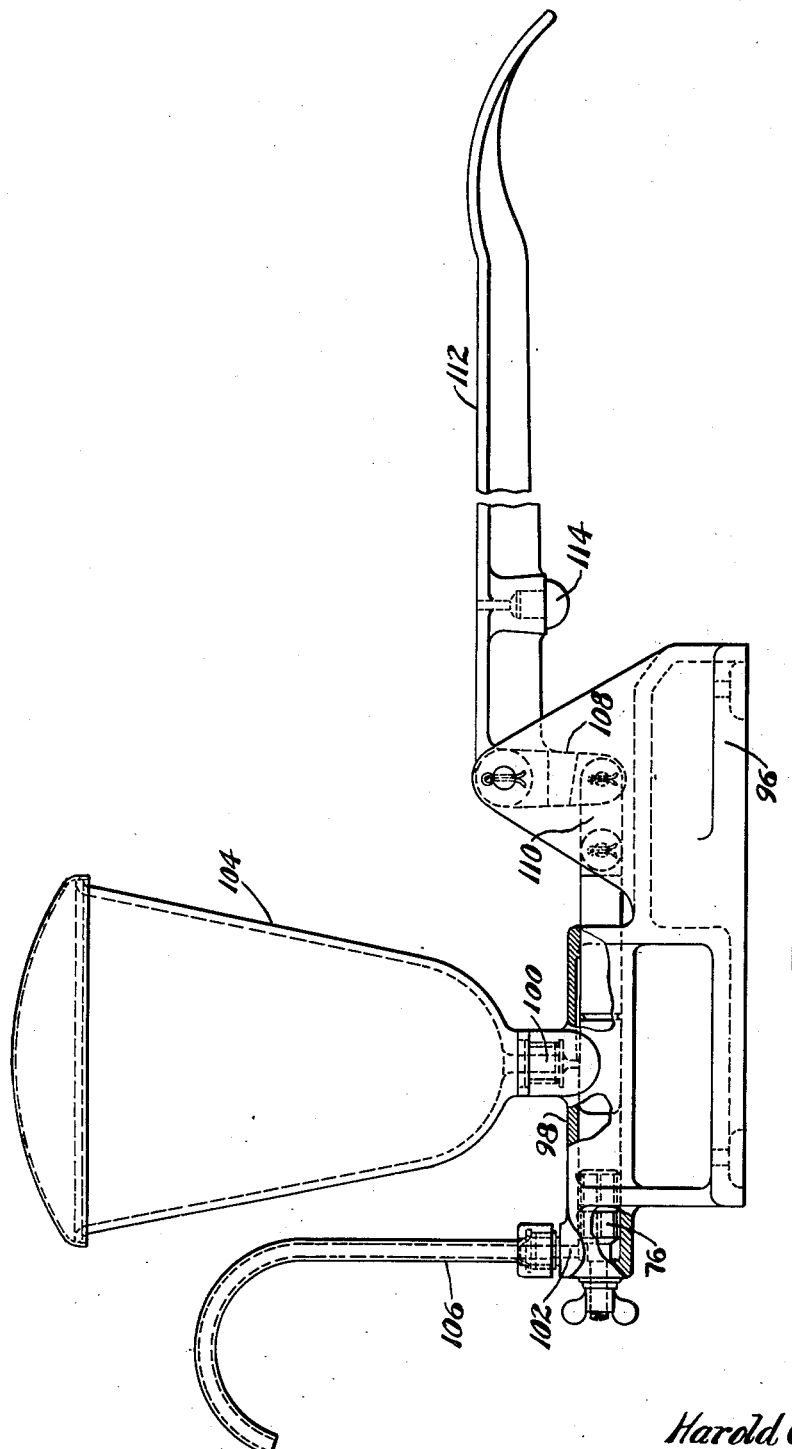
INVENTOR
Harold G. Mac Chesney
BY
ATTORNEY Patented Oct. 17, 1933

1,930,686

UNITED STATES PATENT OFFICE 1,930,686

EMULSIFYING APPARATUS

Harold G. MacChesney, New York, N. Y.

Application March 17, 1933. Serial No. 661,300

6 Claims. (Cl. 99—2)

This invention relates to an emulsifying or homogenizing apparatus and has particular reference to means for treating materials such as milk and butter, for example, under pressure, whereby the constituents of such materials are intimately mixed.

This invention is particularly adapted for the mixing of milk, such as skim milk, or milk powder and butter whereby the emulsified product is rich in butter fat.

Another object of this invention is the provision of means for producing cream by the intimate mixture of skimmed milk with butter, butter fat or an oil of suitable character.

A further object of this invention is the provision of an apparatus for the treatment of liquids which do not readily intimately mix, to the end that an emulsifying or homogenizing thereof may be effected.

A still further object is the provision of an apparatus of the kind described which is easy and inexpensive to manufacture and strong and durable in operation.

Other objects and advantages of this invention will be apparent from the following description taken in conjunction with the accompanying drawings, in which:—

Figure 1 is a sectional view through one form of the invention;

Fig. 4 is a side elevation of the plug valve used with the device;

Fig. 5 is a front elevation of the plug valve of Fig. 4;

Fig. 6 is a rear end elevation of the plug valve;

Fig. 7 is a detail sectional view showing a modified construction at the forward end of the cylinder;

Fig. 9 shows a further modification of the device in which an integral casting is used.

Figure 3:
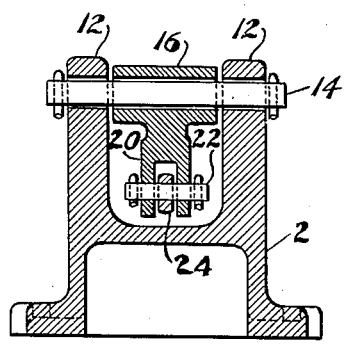
Fig. 3 is a sectional view on the line 3—3, Fig. 1.
Figure 2:
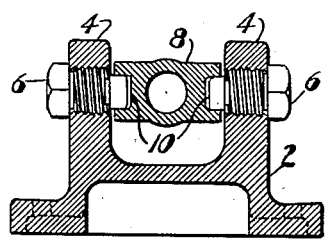
Fig. 2 is a sectional view on the line 2—2, Fig. 1.

Referring now more in detail to the drawings, and particularly to Figs. 1, 2 and 3, the apparatus of the present invention comprises a base 2, a casting in the instance shown, having spaced bearings 4 carrying alined pins 6 which pivotally support a cylinder 8. As clearly shown on Fig. 2 the pins 6 are threaded through the bearings 4 and engage in oppositely arranged sockets 10 formed with the cylinder.

Bearings 4 are arranged adjacent one end portion of the base 2 and are cast integral with rear bearings 12, preferably greater in height than bearings 4 and which support a pintle 14 on which a bell crank lever 16 is pivoted; bell crank lever 16 comprising a long arm or handle portion 18 and a short arm or link 20, the lower end of which latter is bifurcated and is pivotally connected by means of a pin 22 to the rear end portion 24 of a piston 26 working in cylinder 8.

Piston 26 fits the cylinder 8 tightly as clearly shown in Fig. 1, and is provided with an annular groove 28 normally in communication with a longitudinal groove 30 formed in the inner surface of the cylinder.

The cylinder is divided by means of an internal wall 32 into a receiving chamber 33 and an emulsifying chamber 34 and said wall 32 is provided with an aperture 36 adapted to be closed by a plug valve indicated generally at 38. More specifically, the valve 38 constitutes an emulsifying plug, as will be apparent hereinafter, and its rear end portion is reduced in diameter to form a sealing surface 40 adapted to close the aperture 36.

The plug valve 38 comprises a body portion having an annular groove 42 about midway between the ends thereof dividing the body portion into parts 44 and 46, each of which is provided with longitudinal grooves 48; however, as shown clearly in Fig. 4, the respective grooves in parts 44 and 46 are not in alinement. The forward end portion of the valve 38 is reduced in diameter to form a stem 50, adapted to limit movement of the valve in the forward direction by contacting with the end of a screw closure 52 arranged in the forward end portion of the cylinder, this limiting of the valve movement obviously preventing portion 44 of the valve closing a discharge outlet 54 formed at the forward end portion of the cylinder. The outlet is formed through a hollow exteriorly threaded boss 55 to which a coupling 56 is secured which latter connects a discharge tube 57 to the cylinder.

The chamber 33 of the cylinder receives liquid to be emulsified from a hopper 58, the lower end portion of which is provided with an opening, the edge of which is formed with an inwardly extending annular flange 60 which underlies a shoulder 61 at the upper portion of an outlet fitting 68 and is clampingly held against the shoulder by means of a securing nut 63. The lower end portion of the fitting 68 is threadedly connected within an annular rib 64 surrounding an inlet opening 72 in the cylinder. Suitable sealing means 66 are interposed between the cylinder 8 and the outlet fitting 68 for an obvious purpose. As clearly shown in Fig. 4, to obtain the reduced end portion of the plug valve, the end portion therefor is chamfered as shown at 39. At the opposite end of the plug a chamfer 50' is formed and it will be apparent that the chamfer 39 permits an easy flow of liquid into the grooves 48 and the chamfer 50' permits an easy discharge of liquid at the opposite end of the plug all of which will be more clearly described hereinafter.

The base 2 is provided with a bumper 74 of suitable resilient material with which the long arm of the bell crank lever contacts for an obvious purpose.

In the modified form shown in Fig. 7, the wall 32 is omitted within the cylinder and in assembling the device, the plug valve, indicated at 76 in this form, is inserted in the cylinder in advance of the piston and its forward end is reduced in diameter and extended through the front end wall 78 of the cylinder. Said end is threaded and receives a securing nut 80 which not only closes the front end of the cylinder in cooperation with a gasket 82 but serves to hold the plug valve 76 against movement in the cylinder.

Figure 8:
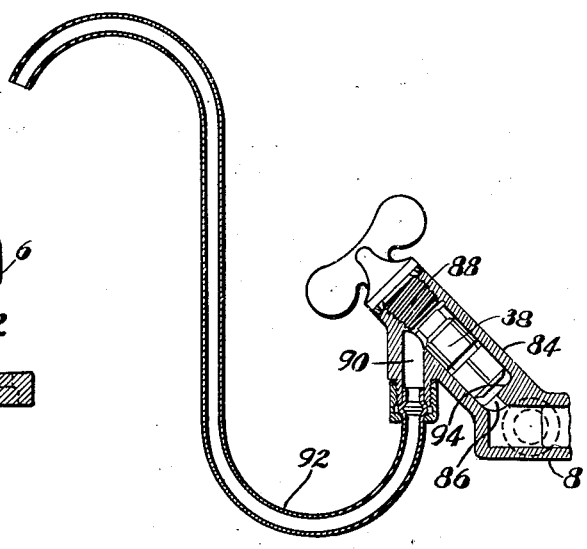
Fig. 8 is a detail section view showing another modification at the discharge end of the cylinder.

Fig. 8 discloses still another modification. In this form, the forward, or discharge end of the cylinder is provided with an offset neck 84, the interior of which communicates with the interior of the cylinder through a restricted opening 86. The neck 84 constitutes the emulsifying chamber and receives plug valve, designated 38, as it is similar in all respects to that shown in Fig. 1. The upper end of neck 84 is closed by a closure member 88 and said neck, at its upper end, is provided with a depending discharge outlet 90 connected to a discharge pipe 92. As will be apparent the lower end portion 94 of the interior of the neck constitutes a stop for limiting the movement of the plug valve 38.

The form shown in Fig. 9 comprises a unitary construction in which the base 96 is cast integral with the cylinder 98, the latter having inlet and outlet portions 100 and 102 for connection with the hopper 104 and discharge nozzle 106. In this form, the short arm 108 of the bell crank lever is pivotally connected with a link 110 the opposite end of which latter is pivotally connected to the rear end portion of the piston which works within the cylinder 98. Also in this form, the long arm 112 of the lever is provided with a bumper element 114 adapted to contact with the base.

In use, the hopper 58 of Fig. 1 is charged with the liquids to be emulsified. In producing cream, skimmed milk, milk powder or milk with low butter content, and butter raised to a temperature sufficient to liquefy it, are used. Movement of the piston 26 by elevation of the long arm of the bell crank lever will create a suction within the cylinder which will cause the plug valve to shift in the emulsifying chamber which will engage the sealing surface with the wall 32 to close the aperture 36 and the suction created by the piston will draw liquids from the hopper into the cylinder. Movement of the piston in the opposite direction will close the entrance port 72 and compress the liquid in the cylinder and force the same through the opening 36 in wall 32 to the emulsifying chamber, the pressure of the fluid forcing the plug 38 forward in the cylinder, then past the chamfer 39 through the grooves in the plug valve and finally out of the emulsifying chamber to the discharge pipe in a homogenized state; the pressure against the liquid in chamber 33 will disrupt the fat globules and cause a primary mixing thereof with the milk. The pressure against the mixture in passing into the emulsifying chamber serves to further more intimately mix the liquids and the passage thereof through the grooves in the plug valve results in finely dividing the fat globules and so thoroughly commingling the liquids as to produce a cream which compares most favorably with the natural article.

In the operation of this device, attention is called to the fact that creams of different consistency may be produced dependent upon the pressure developed. In producing cream for whipping, a thicker emulsion must be produced and this is effected by the development of greater pressure by the piston on the liquids whereby a more intimate commingling of the fat globules and milk is obtained.

The drawings herein are for illustrative purposes only and it is to be understood that various changes in the form and proportions of the device may be made within the scope of the appended claims without departing from the spirit of the invention.

What is claimed is:

1. In an emulsifying apparatus, a hopper for holding liquids to be emulsified, a cylinder in communication with the hopper and provided with an apertured wall therein dividing said cylinder into a receiving chamber and an emulsifying chamber, a piston slidable in the receiving chamber, a discharge means connected with the emulsifying chamber, and an emulsifying plug valve having emulsifying grooves in its periphery and shiftable in the emulsifying chamber having one end reduced in diameter to constitute means for sealing the aperture in said wall.

2. An emulsifier comprising a hopper, a cylinder connected with the hopper and having an apertured partition therein dividing said cylinder into a receiving chamber and an emulsifying chamber, an emulsifying plug valve in the emulsifying chamber and provided with emulsifying grooves in the periphery of the valve, and pressure exerting means in the receiving chamber so formed and arranged as to cause said valve to close said opening in the partition when operated in one direction and to shift the valve from the opening when operated in the opposite direction.

3. In an emulsifying apparatus, a cylinder, a hopper having a discharge outlet leading to the cylinder, an apertured partition in the cylinder dividing the latter into a receiving chamber and an emulsifying chamber, a piston in the receiving chamber, and an emulsifying plug valve loosely arranged in the emulsifying chamber adapted to be shifted by suction created by movement of the piston in one direction to close the aperture in said partition, said valve having emulsifying grooves in its periphery.

4. In an emulsifying or homogenizing device, a pump barrel having a ported partition dividing the barrel into an inlet pump chamber and a discharge emulsifying chamber, an emulsifying plug valve member in the emulsifying chamber and mounted for longitudinal reciprocation therein to close and open the port in the partition, there being restricted emulsifying passages located between the walls of the valve member and the walls of the emulsifying chamber, the valve member being insertable and removable through the outer end of the emulsifying chamber, and removable means closing the outer end of the emulsifying chamber.

5. In an emulsifying or homogenizing device, a pump barrel having a ported partition dividing the barrel into an inlet pump chamber and a discharge emulsifying chamber having smooth interior walls, a unitary emulsifying plug valve member having smooth exterior walls snugly fitting the smooth interior walls of the emulsifying chamber and mounted for longitudinal reciprocation therein to close and open the port in the partition, there being restricted emulsifying passages located between the walls of the valve member and the walls of the emulsifying chamber, the valve member being insertable and removable through the outer end of the emulsifying chamber, and removable means closing the outer end of the emulsifying chamber.

6. In an emulsifying or homogenizing device, a pump barrel having a ported partition dividing the barrel into an inlet pump chamber and a discharge emulsifying chamber, an emulsifying plug valve member snugly fitting the interior walls of the emulsifying chamber and mounted for longitudinal reciprocation therein to close and open the port in the partition, the exterior walls of the plug valve having open ended longitudinally extending and staggered and transversely connected emulsifying grooves.

HAROLD G. MacCHESNEY.